(12) United States Patent
Lindemann et al.

(10) Patent No.: US 7,664,121 B2
(45) Date of Patent: Feb. 16, 2010

(54) METHOD AND ROUTER FOR SWITCHING DATA BETWEEN A LOCAL AREA NETWORK AND AN EXTERNAL APPLIANCE

(75) Inventors: Werner Lindemann, Mulheim (DE); Norbert Schonfeld, Dortmund (DE)

(73) Assignee: Siemens Aktiengesellschaft, Munich (DE)

( * ) Notice: Subject to any disclaimer, the term of this patent is extended or adjusted under 35 U.S.C. 154(b) by 1016 days.

(21) Appl. No.: 10/127,859

(22) Filed: Apr. 22, 2002

(65) Prior Publication Data

US 2002/0154644 A1 Oct. 24, 2002

(30) Foreign Application Priority Data

Apr. 20, 2001 (DE) .................... 101 19 447

(51) Int. Cl.
*H04L 12/28* (2006.01)
*H04L 12/56* (2006.01)
(52) U.S. Cl. ...................... 370/401; 370/245
(58) Field of Classification Search ............... 370/401, 370/352, 353, 338, 446, 466, 428, 245, 402, 370/349; 709/249, 245
See application file for complete search history.

(56) References Cited

U.S. PATENT DOCUMENTS

| 5,095,480 | A | * | 3/1992 | Fenner | 370/238 |
|---|---|---|---|---|---|
| 5,459,721 | A | * | 10/1995 | Yoshida | 370/392 |
| 5,708,654 | A | * | 1/1998 | Arndt et al. | 370/242 |
| 5,745,702 | A | * | 4/1998 | Morozumi | 709/249 |
| 5,754,547 | A | | 5/1998 | Nakazawa | |
| 5,999,535 | A | * | 12/1999 | Wang et al. | 370/401 |
| 5,999,536 | A | * | 12/1999 | Kawafuji et al. | 370/401 |
| 6,055,236 | A | * | 4/2000 | Nessett et al. | 370/389 |
| 6,130,892 | A | * | 10/2000 | Short et al. | 370/401 |
| 6,141,690 | A | | 10/2000 | Weimann | |
| 6,189,042 | B1 | * | 2/2001 | Keller-Tuberg | 709/238 |
| 6,434,627 | B1 | * | 8/2002 | Millet et al. | 709/245 |
| 6,452,920 | B1 | * | 9/2002 | Comstock | 370/349 |
| 6,603,769 | B1 | * | 8/2003 | Thubert et al. | 370/401 |
| 6,631,137 | B1 | * | 10/2003 | Lorrain et al. | 370/401 |
| 6,643,291 | B1 | * | 11/2003 | Yoshihara et al. | 370/395.5 |
| 6,775,262 | B1 | * | 8/2004 | Skog et al. | 370/349 |
| 6,822,955 | B1 | * | 11/2004 | Brothers et al. | 370/389 |
| 6,865,613 | B1 | * | 3/2005 | Millet et al. | 709/245 |
| 6,961,336 | B2 | * | 11/2005 | Coggeshall | 370/389 |
| 6,977,917 | B2 | * | 12/2005 | Skog et al. | 370/349 |
| 7,088,727 | B1 | * | 8/2006 | Short et al. | 370/401 |

(Continued)

FOREIGN PATENT DOCUMENTS

GB 2283645 A 5/1995

(Continued)

*Primary Examiner*—Ayaz R Sheikh
*Assistant Examiner*—Chuong T Ho
(74) *Attorney, Agent, or Firm*—King & Spalding L.L.P.

(57) ABSTRACT

A method is provided for switching data between appliances in a packet-oriented local area network and an external appliance connected to the local area network via a router. The appliances in the local area network, including the router, respectively have a network address and an appliance address. The external appliance has an associated network address. An appliance address request relating to the assigned network address is responded to with the appliance address of the router. The router forwards packets containing the assigned network address and the appliance address of the router as destination addresses from the local area network to the external appliance.

17 Claims, 2 Drawing Sheets

U.S. PATENT DOCUMENTS 7,145,906 B2 * 12/2006 Fenner .................. 370/392
7,411,916 B2 * 8/2008 Sakov et al. ............ 370/252

FOREIGN PATENT DOCUMENTS

| | | |
|---|---|---|
| JP | 11191790 A | 7/1999 |
| WO | WO9946890 A1 | 9/1999 |
| WO | WO 0036794 | 6/2000 |
| WO | WO 0041418 | 7/2000 |
| WO | WO 0077975 A2 | 12/2000 |
| WO | WO 0113598 A2 | 2/2001 |

* cited by examiner

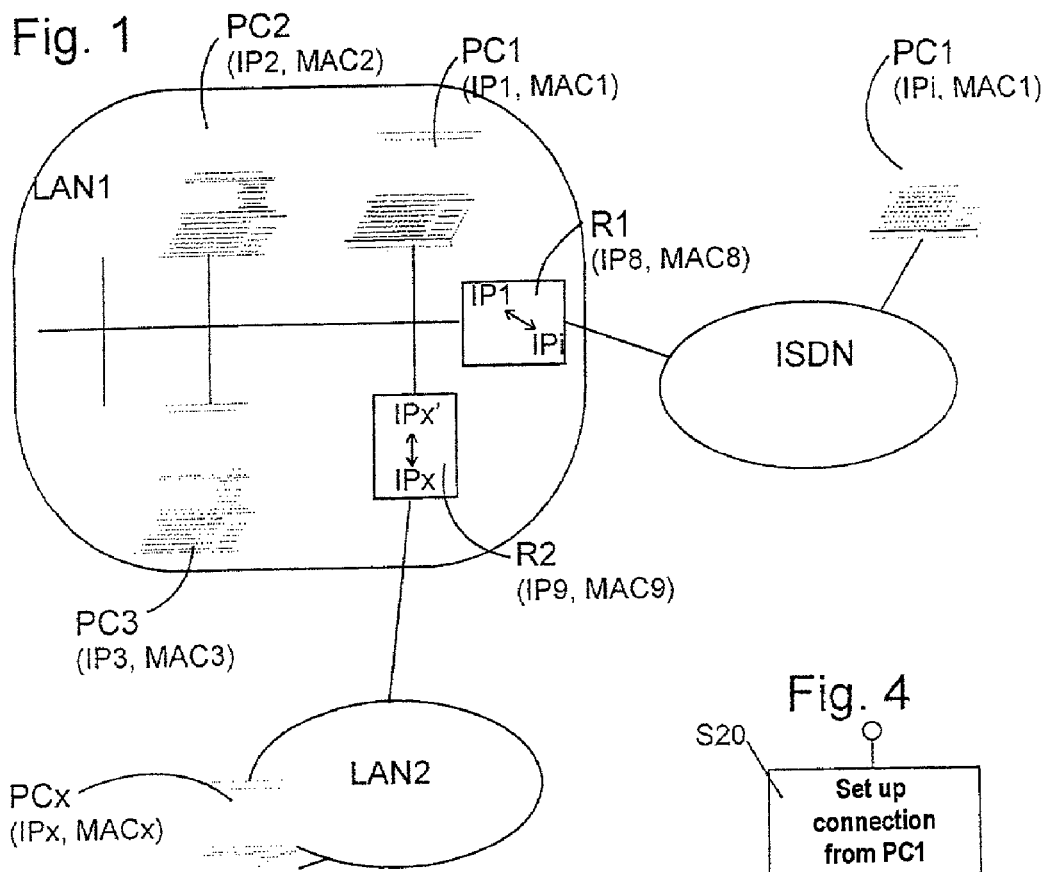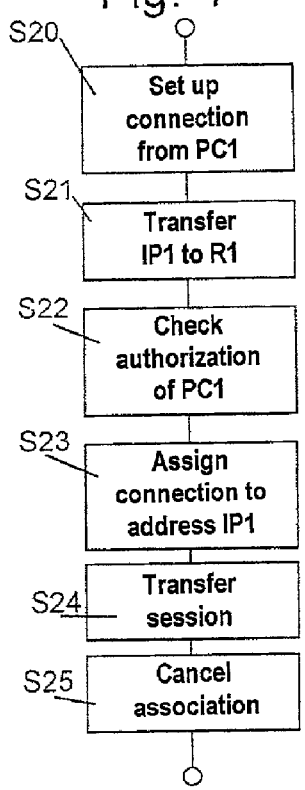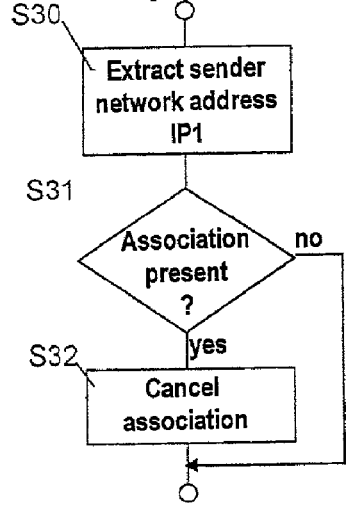

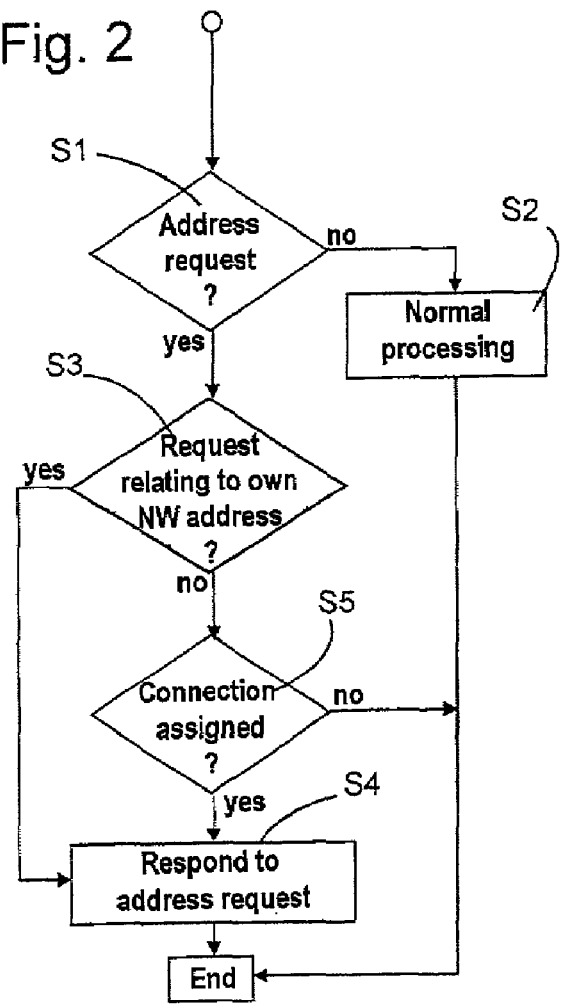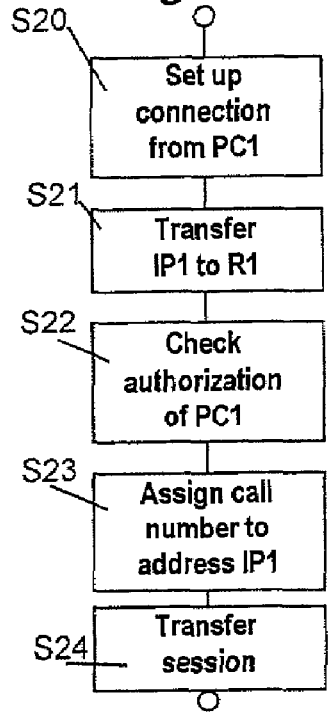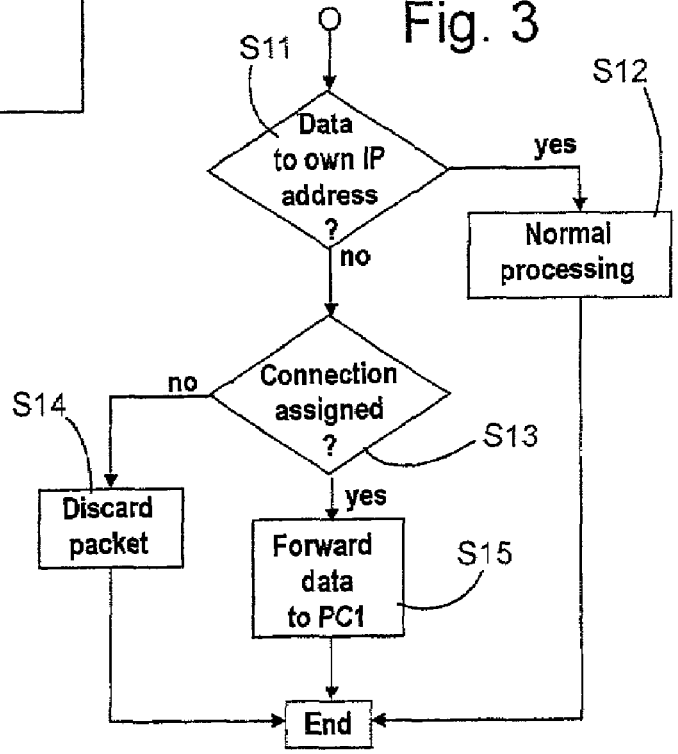

METHOD AND ROUTER FOR SWITCHING DATA BETWEEN A LOCAL AREA NETWORK AND AN EXTERNAL APPLIANCE

BACKGROUND OF THE INVENTION

The present invention relates to a method for switching data between appliances in a packet-oriented local area network and an external appliance connected to the local area network via a router.

In local area networks, such as "intranets" in companies, the individual users have normally extensive, shareable databases and applications available. Data are interchanged in the form of packets between the appliances connected to the local area network.

To route the packets within the local area network, two types of addresses are used, referred to in this case as the appliance address and the network address. The appliance address is firmly prescribed for an appliance by the manufacturer and cannot be altered. The network address is defined within the local area network and can be assigned to an appliance arbitrarily; e.g., by the network administrator. In a local IP network, the MAC address has the function of an appliance address, and the IP address has the function of a network address.

To allow a company's external employees, such as field staff or home workers, access to the intranet, it is desirable to be able to connect external appliances to the intranet which have the same options and access rights as are available to the appliances connected to it directly. A known approach to solving this problem is to define an additional network, referred to as a home network, in which a network address is assigned to the external appliance. A router in the local area network, which router can be connected to the home network, is provided with an entry which causes packets that are circulating in the local area network and are addressed to the home network to be received by the router and forwarded to the home network. However, this solution requires that an appropriate entry be made in the router for each external appliance which needs to communicate with the local area network.

Provided that the home network can be connected to the router, for example via a point-to-point (dialup) connection, this solution allows the external appliance to feed data packets into the local area network and to receive response packets relating to the data packets from appliances in the local area network. However, if an appliance in the local area network, as initiator of a connection, needs to send data to the external appliance, failure often occurs because, although the router has been informed of the home network address, the users or appliances in the local area network have not. If the external appliance is also occasionally operated with a direct connection to the local area network, such as in the case of an employee who sometimes uses a transportable computer in a company's building with direct access to the local area network there and sometimes uses it at home, then the additional problem arises that a user on an appliance in the local area network generally cannot know whether this employee or the computer currently can be reached at home or in the local area network.

If the connection between the local area network and the home network is not set up via a point-to-point connection, but rather via other packet-oriented networks, then another problem of this approach is that, for data packets to be forwarded correctly, an appropriate entry is necessary on every single router through which the data packet passes on the path between the local area network and the external appliance. Since these routers generally are not controlled by the operator of the local area network, the solution described above fails because of prohibitive administration complexity.

It is an object of the present invention, therefore, to specify a method for switching data between appliances in a packet-oriented local area network and an external appliance connected to the local area network via a router, and a router which is suitable for carrying out the method, which allow the external appliance to be connected to the local area network with minimal administration complexity.

SUMMARY OF THE INVENTION

The object is achieved in the first instance by a method for switching data between appliances in a packet-oriented local area network and an external appliance connected to the local area network via a router, where the appliances in the local area network, including the router, respectively have a network address in the local area network and an appliance address, and where:

a network address from the local area network is assigned to the external appliance;

an appliance address request from appliances connected to the local area network which relates to the assigned network address is responded to with the appliance address of the router; and packets containing the assigned network address and the appliance address of the router as destination address are forwarded from the local area network to the external appliance via the router.

For an appliance in the local area network which needs to send a data packet to the external appliance, there is no difference whatsoever between this external appliance and any other appliances connected directly to the local area network. In both cases, a packet is addressed using a network address in the local area network. Entries in a directory allow the router to use the destination network address of data packets sent to its appliance address to identify the required receiver appliance for such a packet and to forward the packet correctly.

Complementarily, packets sent to the local area network by the external appliance via the router are fed into the local area network after having been provided with the network address assigned to the external appliance and with the appliance address of the router.

According to one embodiment of the present invention, provision can be made for the router to communicate with the external appliance via a point-to-point connection; in particular, an ISDN connection. In this case, the router has a directory which contains, in each case in connection with a local area network address whose packets it is forwarding, an entry containing a call number to which it sets up a connection when it receives packets directed to the assigned network address from the local area network and an appropriate connection has not yet been set up.

Particularly in the case of an ISDN connection for which a call number for the caller is signaled to a called terminal, provision can be made for the router to produce such a call number entry automatically as soon as it is called by an external appliance authorized to do so. Before it does this, it uses any method known per se to check the external appliance's authorization to access the local area network. Thus, by way of example, a field staff member visiting a large number of different locations can update the respective call number entry associated with his/her computer in the router by simply setting up a telephone connection to the router, and can thus ensure that the appliances in the local area network can reach his/her computer.

According to another embodiment, the router also can communicate with the external appliance via a second packet-oriented network; e.g., over the Internet. In this case, the external appliance likewise must have an assigned network address in the second network. When forwarding a packet to the external appliance, the router therefore replaces the assigned network address, originally contained in the packet as destination address, in the local area network with the address assigned to the appliance in the second network. For the router, the latter address is contained as sender address; e.g., from a packet received from the external appliance. Address replacement in the opposite direction occurs when a packet coming from the external appliance is fed into the local area network.

Naturally, the two refinements mentioned above also can be combined when the point-to-point connection is used to set up a connection between the local area network and a second network, such as the home network mentioned in the introduction.

One particular advantage of the inventive method and router is that they allow the operation of an individual appliance alternately as an appliance connected directly to the local area network and as an external appliance. That is to say, a user can both connect an appliance, such as a portable computer, directly to the local area network and can use a second network or a telephone network to set up a connection to the local area network, and the transportable computer can address or be addressed by appliances in the local area network without this requiring complex configuration measures in a local area network or the router.

Additional features and advantages of the present invention are described in, and will be apparent from, the following Detailed Description of the Invention and the Figures.

BRIEF DESCRIPTION OF THE FIGURES

FIG. 1 shows a block diagram of a local area network in which the present invention can be applied.

FIGS. 2 and 3 show flowcharts to illustrate processing of data sent to a router by appliances in the local area network.

FIGS. 4 to 6 show flowcharts for initialization processes performed on the router which allow the latter to switch data packets between the local area network and an external appliance.

DETAILED DESCRIPTION OF THE INVENTION

The local area network LAN1 shown in FIG. 1 in the form of a block diagram includes a number of appliances, in particular computers PC1, PC2, PC3, an ISDN router R1 for data transfer between the local area network LAN1 and an ISDN telecommunications network ISDN, and a network router R2 for the data traffic with an external network LAN2. All the appliances PC1, PC2, PC3, R1, R2 connected to the local area network LAN1 have an appliance address firmly prescribed for the respective appliance, or an appliance address MAC1, MAC2, MAC3, MAC8, MAC9, and also a network address, or network address IP1, IP2, IP3, IP8, IP9, in the case of a local area network with an IP structure.

To illustrate the present invention, it is assumed that the computer PC1 shown in FIG. 1 as a laptop is a computer which is occasionally connected directly to the local area network LAN1 by its user and is occasionally operated with a connection to the local area network LAN1 via an ISDN connection and the ISDN router R1. On the basis of these two connection options, the computer PC1 is shown twice in FIG. 1, yet it goes without saying that it is a single appliance which can be in only one of the two positions shown at any one time.

While the computer PC1 is in the local area network, it can communicate with the appliances in the local area network LAN1 in a conventional manner using its addresses MAC1 and IP1. That is to say, it can send data packets to the other appliances PC2, PC3, R1, R9 in the network and can request data from the other appliances.

If an appliance, such as PC2 or PC3, wishes to send data to the computer PC1 without knowing its appliance address, then it first sends a broadcast address request (also referred to as ARP Request) into the local area network LAN1, the broadcast address request specifying the network address IP1 (which is known to the appliance PC2 or PC3) of the computer PC1, in order to find out the appliance address associated with the network address IP1. Such a request is received by all connected appliances, but only the appliance having the corresponding network address responds and outputs its appliance address as a response to the request. That is to say, if the computer PC1 is connected to the local area network LAN1, it can itself respond to the address request with its appliance address MAC 1.

If the computer PC1 is not connected, then no response is given to the request and data cannot be sent to the computer PC1 unless other measures are taken.

If the computer PC1 is connected to the local area network LAN1 via the ISDN network, then the data interchange between it and the appliances in a local area network LAN1 takes place via the ISDN router R1. The way in which the latter works is described below.

FIG. 2 shows a flowchart illustrating the processing of data, transmitted in the local area network LAN1 via broadcast, in the ISDN router R1. First, step S1 establishes whether or not the broadcast data are an address request (ARP Request). If not, then these data are processed further in a form (S2) which is not the subject matter of the present invention and is not described here. If the ISDN router R1 identifies an address request, then it checks in step S3 whether the request relates to its own network address IP8. If so, the router R1 responds to the request by outputting its own appliance address MAC8 in step S4. In this respect, the processing of the address request by the router R1 is identical to that which is also performed by the other appliances connected to the local area network LAN1.

However, if the router identifies in step S3 that the request does not relate to its own network address IP8, it performs another step S5, in which it checks whether the requested network address is possibly contained in an internal directory of network addresses whose associated appliances can be reached via the ISDN network. If this is not the case, processing ends and the router R1 provides no response to the address request. If the network address is found in the directory, the method branches to step S4, and the router R1 provides a response to the address request in which it outputs its own appliance address MAC8 as the sought appliance address.

The result of this is that the appliance which sent the address request now assumes that the appliance address MAC8 of the router R1 belongs to the requested network address. That is to say, if by way of example, the requested network address was the address IP1 of the computer PC1, which is occasionally not on the local area network LAN1 directly, but rather is connected thereto via the ISDN network, then the other appliances in the local area network LAN1 will from now on send data intended for the computer PC1 in packets which contain, as destination addresses, the appliance address MAC8 of the router R1 and the network address IP1 of the computer PC.

The way in which such packets addressed to the appliance address MAC8 of the router R1 are processed by the router R1 is shown in the flowchart in FIG. 3. If the router receives a packet addressed to its appliance address MAC8, then it first checks in step S11 whether the content of the packet is also addressed to its network address IP8, or possibly to another one. If the destination network address is IP8, then the packet involves data which are intended only for the router R1 and not for an appliance which can be connected to it via the ISDN network, and the data are processed by the router R1 in step S12 in a conventional manner.

If the network address is not the address IP8 of the router R1, then the router R1 checks in step S13 whether or not the network address is contained in its internal directory. If not, the packet is incorrectly addressed and is discarded in step S14.

If the directory does contain the destination network address, the router R1 forwards the packet in question to the required appliance in step S15 via an ISDN connection assigned to the specified network address.

In this context, in accordance with one embodiment of the present invention, the internal directory of the router R1 may respectively have recorded such network addresses as are associated with an external appliance which is currently supporting an ISDN connection to the router R1. That is to say, if the computer PC1 is not connected directly to the local area network LAN1, the appliances PC2, PC3 can communicate with the computer PC1 only if there is an ISDN connection to it. If the computer PC1 has set up this connection, unrestricted data interchange is possible between the appliances. While it does not do this, the appliances PC2, PC3 are unable on their part to set up an ISDN connection to the computer PC1. Such regulation can be expedient, for example, if the computer PC1 is the computer of a field staff member which sets up connections to the local area network LAN1 from a multiplicity of different ISDN lines, and in whose regard it is not possible to assume that it can be reached on a given line number for any relatively long time.

An alternative solution is for the internal directory of the router R1 to store network addresses for external appliances, in each case in conjunction with a call number on which these appliances can be reached. In the case of this embodiment, the step S15 of forwarding data from the local area network LAN1 to the external appliance is subdivided into the steps of checking whether an ISDN connection to this appliance has been set up, if so forwarding the data to the external appliance via the connection, and if not first setting up a connection using the call number and then forwarding the data.

In all the cases described above, data packets sent by the external appliance can be fed into the local area network LAN1 by virtue of the router R1, when outputting these data packets to the local area network LAN1, identifying them with the network address stored in the directory and its own appliance address as sender addresses.

The flowchart in FIG. 4 shows work steps for the router R1 when an external appliance initiates the setup of a connection to the local area network LAN1. As soon as the ISDN connection has been set up between the externally operated computer PC1 and the ISDN router R1 via the ISDN network in step S20, the computer PC1 transfers to the router R1 the network address IP1 at which it could be reached if it were operated directly on the local area network LAN1.

The use of the address IP1 ensures access for the computer PC1 to the data and applications in the local area network LAN1 with the same access rights as it has when it is connected to the local area network LAN1 directly.

Depending on the operating system of PC1, it may be necessary to assign two different IP addresses for a LAN connection (IP1) and a dialup connection (IP1) when transportable appliances PC1 are involved. That is to say, when the computer PC1 is connected to the local area network LAN1 directly, it uses the network address IP1, and when it needs to use a dialup connection to make contact with the local area network LAN1, it uses IP1 as the sender address. Conversion from IP1 to IP1 and vice versa is then performed by the router R1.

However, before the computer PC1 can be granted access to the local area network LAN1, an authorization check takes place in step S22 in which, for example by requesting stop words, the identity of the computer PC1 and its access authorization for the local area network LAN1 are checked.

To avoid address conflicts, step S22 can additionally involve the router R1 outputting an address request (ARP Request) into the local area network LAN1 for the network address IP1 used by the computer PC1. If an appliance in the local area network LAN1 responds to the request, the router R1 must refuse access to the local area network LAN1 by the computer PC1.

If the checks in step S22 have been completed successfully, the router R1 assigns the local area network address IP1 to the ISDN connection for the computer PC1. That is to say, data packets received from the computer PC1 are fed into the local area network LAN1 by the router R1 using the addresses IP1 and MAC8, so that an appliance which receives such a packet can respond to it with packets which contain IP1, MAC8 as destination addresses. In the same way, the router R1 is now able to use the methods described with reference to FIGS. 2 and 3 to forward data packets addressed to the network address IP1 from other appliances PC2, PC3 to the computer PC1.

While the ISDN connection exists (step S24), the appliances PC2, PC3 in the local area network LAN1 and the computer PC1 can communicate with one another in exactly the same way as if the computer were connected to the local area network LAN1 directly. As soon as the ISDN connection is terminated, the association is lost, address requests from the appliances PC2, PC3 for the address IP1 can no longer be responded to, and the computer PC1 can no longer be reached by the appliances PC2, PC3.

FIG. 5 shows a modification of the method from FIG. 4. Steps S20 to S22 are the same as already described in relation to FIG. 4, the only difference being that, in the course of the ISDN connection being set up in step S20, a call number for the computer PC1 operated as an external appliance is also transferred to the router R1. In step S23', the router R1 stores the call number as being assigned to the local area network address IP1 used by the computer PC1 operated as an external appliance. While the connection exists (S24), the externally operated computer PC1 is able to communicate with the appliances in a local area network LAN1 without restriction. When the ISDN connection is cleared down again, the association between the call number and the local area network address IP1 continues to exist in the directory of the router R1. As such, the router R1, on receiving an address request relating to the network address IP1, is able to use this call number to attempt to set up a connection to the externally operated computer PC1. If this is successful, it responds to the address request with its own appliance address MAC8. This allows the appliances in the local area network LAN1 to send data to the external computer PC1 without the latter needing to have previously set up the connection for this purpose.

Naturally, this opportunity also could be afforded by virtue of any other type of access to the router R1 producing an association between the network address IP1 and a call number in the router's internal directory. This could be done, by way of example, by the direct intervention of an administrator. It also would be conceivable for the required call number to be transferred to the router R1 from one of the appliances PC2, PC3 operated locally on the network LAN1.

Although the method in FIG. 5 ensures that the appliances connected to the local area network LAN1 have improved access to the externally operated computer PC1, the problem arises that the association produced in step S23' between the address IP1 and a call number continues to exist even when the computer PC1 needs to be operated directly on the local area network LAN1 again. That is to say, when it is connected to the local area network LAN1 again and an address request directed to the network address IP1 is sent by one of the other appliances, the computer PC1 responds to this address request with its appliance address MAC1, and at the same time the router R1 responds to it with its appliance address MAC8. To avoid such a conflict, the router R1 continually monitors the packet data traffic on the local area network LAN1. As FIG. 6 shows, the router extracts the sender network address from every packet on the local area network LAN1 (S30). In step S31, the router R1 checks whether there is an association with the extracted network address in the internal directory. If the sender of the packet is an appliance which is operated permanently on the local area network LAN1, such as PC2 or PC3, the result of the check is negative. If the sender of the packet is the appliance PC1, which was previously operated externally, the router R1 finds an association in the internal directory and erases it in step S32. This ensures that, from now on, an address request for the address IP1 is then responded to only by the computer PC1, and no longer by the router R1.

An alternative option for avoiding address conflicts is for the router R1 to send occasional address requests for the network addresses stored in its internal directory into the local area network LAN1. If an appliance which has one of the stored network addresses, such as the computer PC1 with the network address IP1, has been connected to the local area network LAN1 since the last time such an address request was sent, then this appliance responds to the request and the router R1 reacts to this by erasing the corresponding network address from its directory.

Such an address request can be made by the router R1 cyclically, or it can be triggered by virtue of the router R1 identifying in the local area network LAN1 a packet which contains, as sender address, a network address, stored in the internal directory of the router R1, in combination with an appliance address which is not the appliance address MAC8 of the router R1. If such a case arises, then this is an indication that an appliance might have been connected to the local area network LAN1 again and it is necessary to update the internal directory.

Such an address request also can be triggered by virtue of the router R1 receiving a request to set up an ISDN connection from an external appliance which has an associated network address, such as IP1, in the internal directory or which signals to the router that it is authorized to use the network address IP1. In such a case, the router checks, by transmitting an address request for the network address IP1 into the local area network LAN1, whether a locally connected appliance is using the network address IP1 and, if this is the case, rejects the connection request from the external appliance.

Another option for avoiding address conflicts is to introduce a logon method in which an appliance just connected to the local area network LAN1 automatically reports its network address to the router R1, and the latter then erases its entry, possibly corresponding to the reported address, in its directory.

The present invention has been described above specifically in relation to the case of routing via ISDN connections. However, it is obvious that it can be applied to any other point-to-point connections in the same way.

It also can be applied to the case of a packet-oriented connection between the local area network LAN1 and the external appliance, such as to a connection between an external computer PCx with addresses MACx and IPx and the network router R2 in the local area network LAN1 shown in FIG. 1 via a network LAN2. Thus, in a similar manner to that for the computer PC1 which, irrespective of whether it is operated directly on the local area network LAN1 or externally, has an associated network address IP1 in the local area network LAN1, it is possible to reserve for the computer PCx, which, although it is connected to the network LAN2, has access rights in the local area network LAN1, a network address IPx' in the local area network LAN1, which network address will generally differ from the address IPx of the computer PCx in the network LAN2.

If the computer PCx transfers to the network router R2 a packet containing the address IPx' reserved for it, then, in a similar manner to that described above with reference to FIG. 4, step 23, the network router R2 is able to produce an association between the reserved address IPx' and the address IPx which is contained as sender address in packets sent by the computer PCx. When such an association exists in the network router R2, the network router is able to replace the sender addresses in data packets which it receives from the computer PCx with the reserved network address IPx' and the appliance address MAC9 of the network router R2 and to feed them into the local area network LAN1, and, conversely, to respond to address requests from appliances in the local area network LAN1 which relate to the reserved address IPx' with its own appliance address MAC9, in order then to forward packets directed to the destination address combination IPx', MAC9 to the network LAN2, readdressed to the address IPx corresponding to the computer PCx in the network LAN2. That is to say, if the network address IPx' is not occupied in the local area network LAN1, whether because an appliance to which this address is assigned is not present or is switched off, the network router R2 automatically forwards packets intended for this network address to the computer PCx.

In this way, the appliances in the local area network LAN1 can reach the computer PCx in the same way as an appliance which is connected to this local area network LAN1 directly. The computer PCx has the access rights in the local area network LAN1 which an appliance connected to the local area network LAN1 directly, with the network address IPx', would have. An employee could therefore work either on the computer PCx or on a computer (not shown) connected to the LAN1 directly, with the network address IPx', and would always have identical access rights on both computers. Any change to the access rights for the network address IPx' has the same effect for both computers.

Although the present invention has been described with reference to specific embodiments, those of skill in the art will recognize that changes may be made thereto without departing from the spirit and scope of the present invention as set forth in the hereafter appended claims.

The invention claimed is:

1. A method for switching data between a mobile appliance and appliances in a packet oriented local area network, wherein the mobile appliance is connected to the local area network via one of a direct connection and via a router, and wherein the appliances in the local area network and the router each has a network address and an appliance address, the method comprising:

assigning a fixed address to the mobile appliance;

storing the assigned network address in the router if the mobile appliance is accessible via the router, when the mobile is not directly connected to the local area network;

deleting the assigned network address from the router when the mobile appliance is directly connected to the local area network;

forwarding, by the router, an appliance address request relating to the assigned network address from the mobile appliance to the local area network;

determining whether the requested assignment network address is stored in the router:

responding to the appliance address request relating to the assigned network address with the appliance address of the router if the requested assigned network address is stored in the router: and forwarding packets containing the assigned network address and the appliance address of the router as destination addresses from the local area network to the mobile appliance via the router.

2. A method for switching data as claimed in claim 1, the method further comprising the step of feeding the packets sent to the local area network by the mobile appliance via the router into the local area network after having been provided with the assigned network address and the appliance address of the router.

3. A method for switching data as claimed in claim 1, wherein the router communicates with the mobile appliance via a point-to-point ISDN connection.

4. A method for switching data as claimed in claim 1, wherein the router communicates with the mobile appliance via a second packet-oriented network.

5. A method for switching data as claimed in claim 4, the method further comprising the step of replacing, via the router, when forwarding a packet to the mobile appliance, the assigned network address contained as destination address with a network address for the mobile appliance received via the second network.

6. A method for switching data as claimed in claim 1, the method further comprising the step of replacing, via the router, when feeding a packet into the local area network, an address contained as sender address with the assigned address.

7. A method for switching data as claimed in claim 1, the method further comprising the step of canceling, via the router, when receiving from the local area network a packet which contains the assigned network address as sender address, the assignment of the fixed address to the mobile appliance.

8. A method for switching data as claimed in claim 1, wherein, when receiving an assignment instruction from one of the local area network and the mobile appliance, the router produces the assignment of the fixed address to the mobile appliance.

9. A router for switching data between a mobile appliance and a plurality of appliances in a packet-oriented local area network, wherein:

the mobile appliance is connected to the local area network via one of a direct connection and via the router, wherein the plurality of appliances in the local area network and the router each has both a network address in the local area network and a fixed appliance address, the router comprising a directory for a network address assigned to a mobile appliance if the mobile appliance is accessible via the router, when the mobile appliance is not directly connected to the local area network, wherein the router responds to an appliance address request relating to the assigned network address with the appliance address of the router, and forwards packets containing the assigned network address and the appliance address of the router as destination address from the local area network to the mobile appliance, and wherein when the mobile appliance is directly connected to the local area network, the router deletes the network address assigned to the mobile appliance from the directory.

10. A router for switching data as claimed in claim 9, wherein the router provides packets sent from the mobile appliance to the local area network with the assigned network address of the appliance address of the router and feeds them into the local area network.

11. A method for switching data as claimed in claim 9, wherein the router is connected to the mobile appliance via a point-to-point connection.

12. A router for switching data as claimed in claim 11, wherein the directory stores a call number in connection with an assigned network address.

13. A router for switching data as claimed in claim 9, wherein the router is connected to the mobile appliance via a second packet-oriented network.

14. A router for switching data as claimed in claim 13, further comprising a directory for a network address associated with a mobile appliance in the second network, wherein, when a packet intended for the mobile appliance is transferred to the second network, the router replaces the network address of the mobile appliance which is contained in the packet as destination address and is assigned in the local area network with the network address assigned in the second network.

15. A router for switching data as claimed in claim 13, further comprising a directory for a network address associated with a mobile appliance in the second network, wherein, when a packet originating in the mobile appliance is transferred to the local area network, the router replaces the network address which is contained in the packet as sender address and is assigned in the second network with the network address assigned in the local area network.

16. A router for switching data as claimed in claim 13, further comprising a directory for a network address associated with a mobile appliance in the second network, wherein, when a packet intended for the mobile appliance is transferred to the second network, the router replaces the network address of the mobile appliance which is contained in the packet as destination address and is assigned in the local area network with the network address assigned in the second network, and, when a packet originating in the mobile appliance is transferred to the local area network, the router replaces the network address which is contained in the packet as sender address and is assigned in the second network with the network address assigned in the local area network.

17. A router for switching data as claimed in claim 9, wherein the directory can be altered by information received from one of the local area network and the mobile appliance.

\* \* \* \* \*